Figure 3:
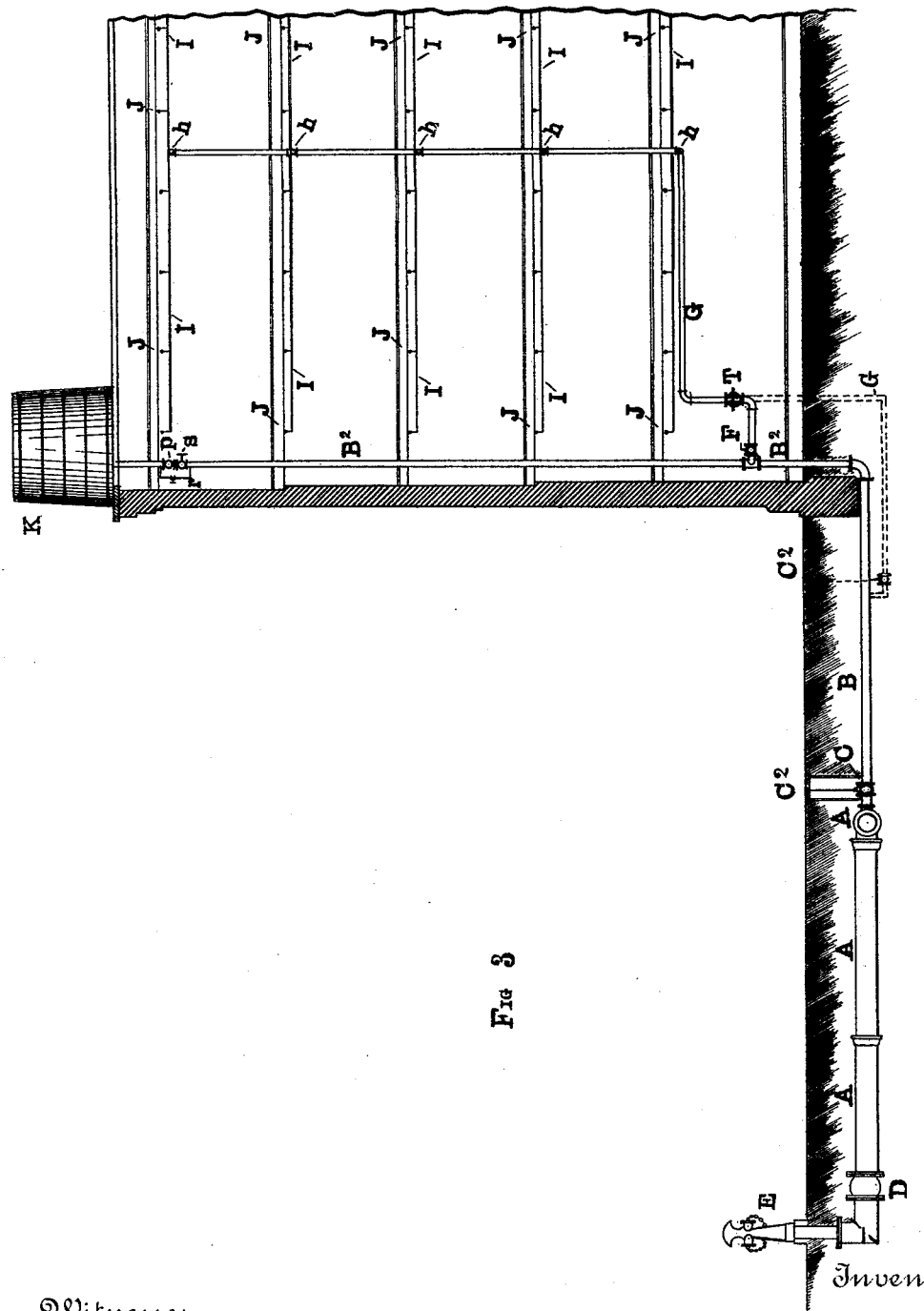

(No Model.)  2 Sheets—Sheet 1.
M. MAGINN.
WATER SYSTEM FOR PROTECTING BUILDINGS AGAINST FIRE.
No. 415,212.  Patented Nov. 19, 1889.
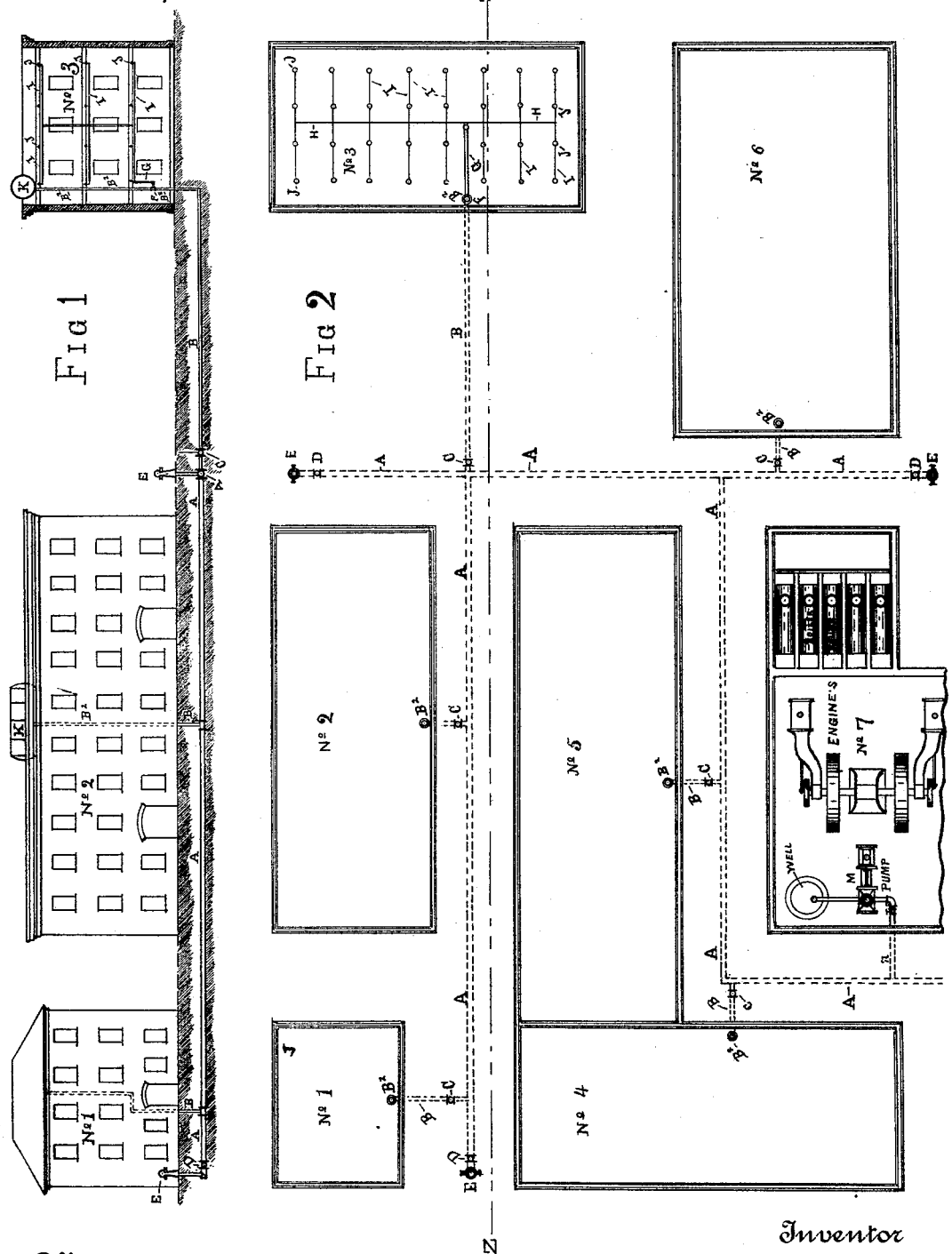
Witnesses
Wm N Smith
G. A Maginn
Inventor
Madison Maginn (No Model.) 2 Sheets—Sheet 2.
M. MAGINN.
WATER SYSTEM FOR PROTECTING BUILDINGS AGAINST FIRE.
No. 415,212. Patented Nov. 19, 1889.

Witnesses
A. Smith
G. A. Maginn

Inventor
Madison Maginn

UNITED STATES PATENT OFFICE.

MADISON MAGINN, OF CHICAGO, ILLINOIS.

WATER SYSTEM FOR PROTECTING BUILDINGS AGAINST FIRE.

SPECIFICATION forming part of Letters Patent No. 415,212, dated November 19, 1889.

Application filed August 6, 1888. Serial No. 282,104. (No model.)

*To all whom it may concern:*

Be it known that I, MADISON MAGINN, a citizen of the United States, residing at Chicago, in the county of Cook and State of Illinois, have invented a new and useful Water System for Protecting Buildings Against Fire, of which the following is a specification.

My invention relates to improvements in a water system supplying buildings and manufacturing plants with water for protection against fire, &c., whereby the said water system may be tapped and connected to a fire-extinguishing apparatus inside of said buildings to supply the same when desired, and through the said connection my water-supply system will operate in conjunction with said fire-extinguishing apparatus.

The objects of my improvements are, first, to provide ways and means whereby buildings adjoining each other and equipped with fire-extinguishing apparatus can get their supply of water and be protected one against the other and independent of each other; second, to provide ways and means whereby buildings equipped with automatic sprinklers or other fire-extinguishing apparatus are not dependent upon a single source of water-supply; third, to provide ways and means whereby such buildings or manufacturing plants have the advantages of a water-supply system for fire purposes and protection either from a fire-pump in the engine-house or other convenient locality, or by city fire-engines, or by pressure or gravity tanks located at most convenient places throughout the buildings or plant, or all these sources combined, and still retain independent connection and protection to each building without a possibility of any one or more buildings disabling the water system and supply; fourth, to provide ways and means whereby a wet or dry or both systems of fire-extinguishing apparatus within the buildings may be readily and effectively supplied by my system, and each independent of the other; fifth, to provide ways and means whereby city fire-engines or steamers connecting to my water system can replenish the same with water from the city's mains or other source of water-supply, and yet not be able to take any of the water out of my water system, thus providing against any possibility of fire-engines taking away any of my system's water-supply by mistaking the use of the hydrant. I attain these objects by the mechanism illustrated in the accompanying drawings, of which there are two sheets.

Figure 1 is an elevation of two buildings and a section of a third. The three together constitute a plant equipped with my improved apparatus. Of these buildings No. 1 is the office, No. 2 the finishing-house, and No. 3 the warehouse. This view is taken on the dotted lines $z\ z$ of Fig. 2. Fig. 2 is a plan view of the complete plant. Building No. 1 is the plan of the office. No. 2 is the plan of the painting and finishing house. No. 3 is the plan of the warehouse; No. 4, plan of the blacksmith-shop, No. 5, plan of the machine-shop; No. 6, plan of the foundry; No. 7, plan of the engine, boiler, and pump house. Fig. 3, Sheet 2, is an enlarged view in elevation of a portion of my water system, showing how it may be tapped and connected to a fire-extinguishing apparatus within the buildings and supply the same.

Similar letters refer to similar parts throughout the several views.

A is an iron-pipe main laid under ground and is independent of city or other mains, and remains constantly filled with water under a pressure. Said main can be connected to the city's water-main by placing a check-valve on the connection operating "against" the city's water-supply; or, in other words, said valve must be placed so that the city's pressure in said city's water-main must be greater than the pressure in my independent water-main and supply system to open the said check-valve to allow of an open communication between the two said mains.

B is a branch pipe connected to the underground main A, and leads also under ground under or through the foundations of the buildings, thence up, and is termed a "stand-pipe" $B^2$ from its connection above ground to its connection with the pressure or gravity-tank K, located and arranged on the top of the buildings. (See Fig. 3.) The object of this tank and its connection, and the stand-pipe $B^2$, with branch pipe B to the independent outside underground main A, is to secure a positive gravity pressure and supply-head upon the aforesaid underground outside main A and upon a fire-extinguishing apparatus within the building when such is attached to my water-supply system. This branch pipe B or stand-pipe B² may be tapped and connected to any fire-extinguishing apparatus within the building, and my water-supply system will operate in conjunction with the same, as shown in Fig. 3, Sheet 2. Said stand-pipe B² is really a continuation of branch pipe B, and the latter is really a continuation of the independent underground main A of the water-supply system.

C is an independent underground outside cut-off valve, and is located at a distance from the buildings beyond the reach of fire in the street or by-way, as the circumstances of the plant to be protected will permit, and is arranged to be operated by hand, wrench, or lever prepared for the same. This cut-off valve C is for the express purpose of cutting off a building on fire that has got beyond the control of the fire-extinguishing apparatus within the building in order that the remainder of my water system may be preserved intact and operative for fire protection to the surrounding buildings.

D is an independent outside underground check-valve on the hydrant-connection to main A. Said valve is set against the hydrant E, to make it an impossibility for fire-engines to take their supply from my water system or a liability of crippling the water system should any one tamper with the hydrant or open the gate-valve in the same. The check-valve D serves the double function of holding in the water if hydrant is opened or if gate-valve in same is opened.

E is a hydrant for fire-engines to connect to and supply and replenish my water system when necessary. This hydrant has an independent connection to said underground main A and is located at a distance from the buildings beyond the reach of fire or of sufficient numbers to enable one or more of said hydrants to be remote and at a safe distance from the fire for steamers to connect to without endangering the men or appliances of the fire department.

When desired, or it becomes necessary to supply an automatic sprinkler equipment or other fire-extinguishing apparatus within the buildings from my water-supply system, I tap the stand-pipe B² at the alarm-valve F with the pipe G and connect the pipe G to the fire-extinguishing apparatus, as shown on Sheet 2, Fig. 3, or by the pipe G, dotted lines, with an outside cut-off valve C², as may be preferred or desired.

I have shown in Fig. 3, Sheet 2, and No. 3, Sheet 1, an elevation and plan view of an ordinary sprinkler equipment within a building. I do this to show clearly how my water-supply system can be attached to and supply a fire-extinguishing apparatus within the building and work in conjunction with the same.

I do not lay any claims to the piping of a building for automatic sprinklers or the placing in of the sprinkler-heads.

Fig. 3 is intended to show plainly that portion of my water-supply system that connects with supplies and operates in conjunction with said fire-extinguishing apparatus within the buildings.

H is the distributing-pipes supplied by the vertical extension of the connection-pipe G, commonly called the "riser."

I are the lateral pipes, upon which the sprinkler-heads J are attached, ordinarily placed ten feet apart in each direction.

T is an automatic valve controlling the supply of water from the water-supply system to the sprinkler equipment or heads. This completes the general requirements of the ordinary sprinkler equipment.

At or near the connection to the tank K on the stand-pipe B², I place a gate-valve S, also a check-valve P, as shown in elevation, Fig. 3. The object of the check-valve P is to prevent the rise and flow of water up into the gravity or pressure tank K. Therefore the check-valve is said to be "against" the tank. When the pumps are in operation supplying my water system, their force or pressure closes the check-valves P against the water-supply from entering the tank K, and the different tank-supplies are held in reserve as an automatic secondary source of water-supply in case the pumps, steamers, or fire-engines would break down. In such emergency the different tanks connected to my water-supply system would supply any fire-extinguishing apparatus that may be attached to my water-supply system until their contents would become exhausted. The gate-valve S is always open, and is only used in case of repairs.

To fill the different tanks from my water-supply system, I place a small by-pass R around the gate and check-valves P and S on the stand-pipe B², said by-pass having a hand-valve for letting on and shutting off the supply when the tank is full.

I am aware that prior to my invention partial attempts at laying pipes under ground have been made in this direction; but I am not aware that the combination studied out by actual experiments as designed and set forth in the annexed drawings and specification have ever before reached such a state of perfection as I have combined in my invention.

Therefore, what I claim, and desire to secure by Letters Patent, is—

The combination, with a fire-extinguishing system, of a main A, extending to two or more buildings, an injection-pipe E, connected to said main, a check-valve D on said connection to said main to prevent the escape of water from said main, a gravity or pressure tank K, located on one or more of said buildings, a stand-pipe $B^2$, connecting each of said tanks with said main, a check-valve P in said stand-pipe to prevent the rise of water into said tank, a by-pass R around said check-valve for filling said tank, and a connection F on said stand-pipe below said check-valve supplying a fire-extinguishing apparatus, substantially as and for the purposes specified.

MADISON MAGINN.

Witnesses:
JOHN G. SMITH,
WM. N. SMITH.